(12) United States Patent
Liu et al.

(10) Patent No.: US 9,800,443 B2
(45) Date of Patent: Oct. 24, 2017

(54) MULTI-MODE WIRELESS TERMINAL

(71) Applicant: Huawei Device Co., Ltd., Shenzhen (CN)

(72) Inventors: Pengfei Liu, Beijing (CN); Zuyuan Zhang, Beijing (CN)

(73) Assignee: Huawei Device Co., Ltd., Shenzhen (CN)

(*) Notice: Subject to any disclaimer, the term of this patent is extended or adjusted under 35 U.S.C. 154(b) by 0 days.

(21) Appl. No.: 15/120,983

(22) PCT Filed: Feb. 9, 2015

(86) PCT No.: PCT/CN2015/072591
§ 371 (c)(1),
(2) Date: Aug. 23, 2016

(87) PCT Pub. No.: WO2015/127854
PCT Pub. Date: Sep. 3, 2015

(65) Prior Publication Data
US 2016/0365995 A1 Dec. 15, 2016

(30) Foreign Application Priority Data
Feb. 26, 2014 (CN) .......................... 2014 1 0066566

(51) Int. Cl.
*H04W 88/06* (2009.01)
*H04B 7/08* (2006.01)
(Continued)

(52) U.S. Cl.
CPC ........... *H04L 27/2601* (2013.01); *H04B 7/08* (2013.01); *H04L 43/028* (2013.01); *H04W 88/06* (2013.01)

(58) Field of Classification Search
CPC .. H04L 27/2601; H04L 43/028; H04W 88/06; H04B 7/08
(Continued)

(56) References Cited

U.S. PATENT DOCUMENTS 9,356,663 B2   5/2016   Seo et al.
2005/0085260 A1* 4/2005 Ella ...................... H04B 1/0057
                                                          455/552.1
(Continued)

FOREIGN PATENT DOCUMENTS

CN       1349688 A        5/2002
CN     101267666 A        9/2008
(Continued)

*Primary Examiner* — Inder Mehra
(74) *Attorney, Agent, or Firm* — Leydig, Voit & Mayer, Ltd.

(57) ABSTRACT

A multi-mode wireless terminal, which includes a path of a first wireless communications standard and a path of a second wireless communications standard; the path of the first wireless communications standard includes a first antenna module, a first transceiver module and a first baseband module, where the first antenna module connects to the first transceiver module, and the first transceiver module connects to the first baseband module; the path of the second wireless communications standard includes a second antenna module, a second transceiver module and a second baseband module, where the second antenna module connects to the second transceiver module, and the second transceiver module connects to the second baseband module; the second transceiver module connects to the first baseband module; the second antenna module and the second transceiver module serve as a diversity receive path of the first wireless communications standard when at an idle timeslot.

6 Claims, 4 Drawing Sheets

(51) Int. Cl.
*H04L 27/26* (2006.01)
*H04L 12/26* (2006.01)

(58) Field of Classification Search
USPC ... 455/422.1, 426.1, 432.2, 434, 435.2, 443, 455/452.1; 375/260, 347
See application file for complete search history.

(56) References Cited

U.S. PATENT DOCUMENTS

| | | |
|---|---|---|
| 2005/0259684 A1 | 11/2005 | Csapo |
| 2007/0218846 A1 | 9/2007 | Neill et al. |
| 2007/0242784 A1 | 10/2007 | Sampson et al. |
| 2008/0227485 A1 | 9/2008 | Kim |
| 2013/0142090 A1 | 6/2013 | Seo et al. |
| 2017/0078951 A1* | 3/2017 | Lee ................... H04L 43/0829 |

FOREIGN PATENT DOCUMENTS

| | | |
|---|---|---|
| CN | 101662817 A | 3/2010 |
| CN | 101772216 A | 7/2010 |
| CN | 103138811 A | 6/2013 |
| CN | 103368625 A | 10/2013 |
| CN | 103781202 A | 5/2014 |
| EP | 1164719 A1 | 12/2001 |
| EP | 2600537 A1 | 6/2013 |
| JP | 2012105334 A | 5/2012 |
| KR | 20130061868 A | 6/2013 |
| WO | 2013165680 A1 | 11/2013 |
| WO | WO 2013165680 A1 | 11/2013 |

\* cited by examiner

MULTI-MODE WIRELESS TERMINAL

CROSS-REFERENCE TO RELATED APPLICATIONS

This application is a National Stage of International Application No. PCT/CN2015/072591, filed on Feb. 9, 2015, which claims priority to Chinese Patent Application No. 201410066566.4, filed on Feb. 26, 2014, both of which are hereby incorporated by reference in their entireties.

TECHNICAL FIELD

Embodiments of the present disclosure relate to the field of wireless communications technologies, and in particular, to a multi-mode wireless terminal.

BACKGROUND

With development of wireless communications technologies, wireless terminals, such as mobile phones, mostly support multiple wireless communications standards, for example, Global System for Mobile Communications (GSM), Code Division Multiple Access (CDMA), and Wireless Fidelity (WiFi). Particularly, some dual card dual standby mobile phones generally support GSM and CDMA or GSM and Wideband Code Division Multiple Access (WCDMA) at the same time, and receive wide popularity from many consumers.

For a wireless terminal that supports multiple standards, each standard uses an individual antenna to receive and send data. However, because a data service and a call service may coexist in one wireless communications standard, and the data service and the call service may occupy a same path resource, a path resource needs to be reserved for the call service to monitor the call service, so as to ensure a call connection rate of the call service of the wireless terminal, which, however, sacrifices a rate of the data service.

SUMMARY

Embodiments of the present disclosure provide a multi-mode wireless terminal, to improve receive performance.

According to a first aspect, a multi-mode wireless terminal is provided, including a path of a first wireless communications standard and a path of a second wireless communications standard, where the first wireless communications standard is different from the second wireless communications standard;

the path of the first wireless communications standard includes a first antenna module, a first transceiver module, and a first baseband module, where the first antenna module connects to the first transceiver module, and the first transceiver module connects to the first baseband module;

the path of the second wireless communications standard includes a second antenna module, a second transceiver module, and a second baseband module, where the second antenna module connects to the second transceiver module, and the second transceiver module connects to the second baseband module;

the second transceiver module connects to the first baseband module; and the second transceiver module includes a control unit, where the control unit is configured to control the second antenna module and the second transceiver module to serve, at an idle timeslot of the second wireless communications standard, as a diversity receive path of the first wireless communications standard.

In a first possible implementation manner of the first aspect, the path of the second wireless communications standard further includes a second filter module;

a passband of the second filter module is located in a receive frequency band of the first wireless communications standard and the passband of the second filter module is located in a receive frequency band of the second wireless communications standard; and the second baseband module connects to the second transceiver module through the second filter module, and the first baseband module connects to the second transceiver module through the second filter module.

With reference to the first possible implementation manner of the first aspect, in a second possible implementation manner, the second wireless communications standard includes a first receive frequency band and a second receive frequency band, and the passband of the second filter module is located in the receive frequency band of the first wireless communications standard and the passband of the second filter module is located in the first receive frequency band of the second wireless communications standard;

the path of the second wireless communications standard further includes a third filter module;

a passband of the third filter module is located in the second receive frequency band of the second wireless communications standard, and the third filter module is located between the second baseband module and the second transceiver module; and the control unit is further configured to, when the multi-mode wireless terminal operates in the first receive frequency band of the second wireless communications standard, control the second transceiver module to connect to the second filter module; and when the multi-mode wireless terminal operates in the second receive frequency band of the second wireless communications standard, control the second transceiver module to connect to the third filter module.

With reference to the second possible implementation manner of the first aspect, in a third possible implementation manner, the control unit is further configured to, when the multi-mode wireless terminal operates in the second receive frequency band of the second wireless communications standard, control the second transceiver module to connect to the second filter module at idle timeslots of the first receive frequency band of the second wireless communications standard and idle timeslots of the second receive frequency band of the second wireless communications standard.

With reference to the first aspect or any one of the first to the third possible implementation manners of the first aspect, in a fourth possible implementation manner, the first transceiver module connects to the second baseband module;

the first transceiver module includes a second control unit, where the second control unit is configured to control the first antenna module and the first transceiver module to serve, at an idle timeslot of the first wireless communications standard, as a diversity receive path of the second wireless communications standard.

With reference to the fourth possible implementation manner of the first aspect, in a fifth possible implementation manner, the path of the first wireless communications standard further includes a first filter module;

a passband of the first filter module is located in the receive frequency band of the second wireless communications standard and the receive frequency band of the first wireless communications standard; and the first baseband module connects to the first transceiver module through the first filter module, and the second baseband module connects to the first transceiver module through the first filter module.

With reference to the first aspect or any one of the first to the fifth possible implementation manners of the first aspect, in a sixth possible implementation manner, the first wireless communications standard is Code Division Multiple Access CDMA, and the second wireless communications standard is Global System for Mobile Communication GSM.

According to the multi-mode wireless terminal provided in the embodiments of the present disclosure, an antenna module and a transceiver module of one wireless communications standard of the multi-mode wireless terminal are used as a diversity receive path of another wireless communications standard, and a control unit is set in the transceiver module that serves as the diversity receive path, where the control unit is configured to control the antenna module and the transceiver module to serve, at an idle timeslot, as the diversity receive path of the another wireless communications standard, so that the one wireless communications standard of the multi-mode wireless terminal may use an idle timeslot of the another wireless communications standard to receive a signal, which improves receive performance of the multi-mode wireless terminal.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

In a multi-mode wireless terminal in the prior art, for example, a dual card dual standby mobile phone that supports CDMA and GSM, an individual primary antenna is configured for CDMA and GSM. Both CDMA and GSM have a data service and a call service, and the data service and the call service generally use a same circuit path. With development of network technologies, a user spends increasingly long time on surfing the Internet through a mobile phone, and instant communication software or other application software on the mobile phone may also require the mobile phone to be in an online state for a long time. As a result, a contradiction exists between the data service and the call service, that is, the path of the call service is occupied when the mobile phone performs the data service, which lowers a call connection rate of the call service. For example, when a user is browsing a web page through a CDMA network, the call connection rate of a CDMA call service is lowered. To increase the call connection rate of the call service, a rate of the data service needs to be lowered and some path resources need to be reserved for monitoring the call service, which, however, is implemented by sacrificing the rate of the data service.

The multi-mode wireless terminal provided in the embodiments of the present disclosure may be a wireless terminal device that supports multiple wireless communications standards, such as a mobile phone and a tablet computer. The following embodiments of the present disclosure use only a mobile phone that support two standards as an example to describe the multi-mode wireless terminal provided in the present disclosure. However, the multi-mode wireless terminal provided in the present disclosure is not limited by the following embodiments.

Figure 1:
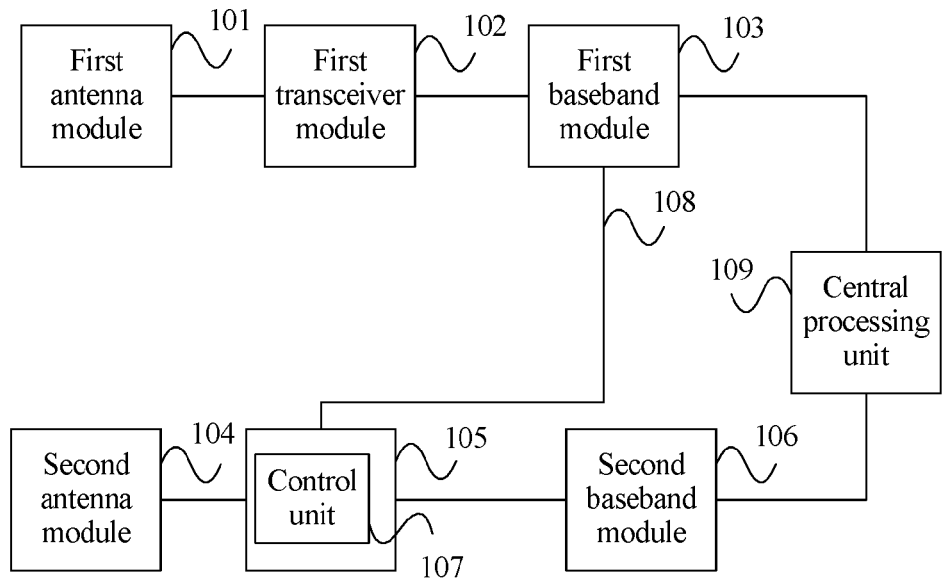
FIG. 1 is a schematic structural diagram of Embodiment 1 of a multi-mode wireless terminal according to an embodiment of the present disclosure.

FIG. 1 is a schematic structural diagram of Embodiment 1 of a multi-mode wireless terminal according to an embodiment of the present disclosure. As shown in FIG. 1, the multi-mode wireless terminal in this embodiment includes:

a path of a first wireless communications standard and a path of a second wireless communications standard, where the first wireless communications standard is different from the second wireless communications standard; the path of the first wireless communications standard includes a first antenna module 101, a first transceiver module 102, and a first baseband module 103, where the first antenna module 101 connects to the first transceiver module 102, and the first transceiver module 102 connects to the first baseband module 103; the path of the second wireless communications standard includes a second antenna module 104, a second transceiver module 105, and a second baseband module 106, where the second antenna module 104 connects to the second transceiver module 105, and the second transceiver module 105 connects to the second baseband module 106; the second transceiver module 105 connects to the first baseband module 103; the second transceiver module 105 includes a control unit 107, where the control unit 107 is configured to control the second antenna module 104 and the second transceiver module 105 to serve, at an idle timeslot of the second wireless communications standard, as a diversity receive path of the first wireless communications standard.

Specifically, the multi-mode wireless terminal provided in this embodiment supports two wireless communications standards, which are respectively the first wireless communications standard and the second wireless communications standard, and the first wireless communications standard is different from the second wireless communications standard, for example, the first wireless communications standard is CDMA and the second wireless communications standard is GSM, or the first wireless communications standard is WCDMA and the second wireless communications standard is GSM.

In the first wireless communications standard, a link that includes the first antenna module 101, the first transceiver module 102, and the first baseband module 103 forms the path of the first wireless communications standard, and the multi-mode wireless terminal may use the path of the first wireless communications standard to perform data sending and receiving of the first wireless communications standard. The first antenna module 101 is configured to receive a radio signal of the first wireless communications standard. The first transceiver module 102 may specifically include components such as a duplexer, a power amplifier, and a surface acoustic wave (SAW) filter. In conclusion, the first transceiver module 102 is configured to implement a transceiver function for a radio frequency signal of the first wireless communications standard. The first baseband module 103 is configured to perform baseband signal processing of the first wireless communications standard. In the second wireless communications standard, a link that includes the second antenna module 104, the second transceiver module 105, and the second baseband module 106 forms the path of the second wireless communications standard, and the multi-mode wireless terminal may use the path of the second wireless communications standard to perform data sending and receiving of the second wireless communications standard. The second antenna module 104 is configured to receive a radio signal of the second wireless communications standard, and the second transceiver module 105 is configured to implement a transceiver function for a radio frequency signal of the second wireless communications standard. The second baseband module 106 is configured to perform baseband signal processing of the second wireless communications standard. The path of the first wireless communications standard and the path of the second wireless communications standard are generally independent of each other, and each module independently completes data transmission and processing tasks of its own wireless communications standard.

In this embodiment, the path of the second wireless communications standard needs to serve as a diversity receive path of the first wireless communications standard, and therefore, the second transceiver module 105 connects to the first baseband module 103. A connection line between the second transceiver module 105 and the first baseband module 103 may be referred to as a diversity receive path 108, where the diversity receive path 108 includes a signal line for receiving data and a related matching network. However, the diversity receive path 108 does not include any component that has a control function, that is, the diversity receive path 108 is configured only to transmit data from the second transceiver module 105 to the first baseband module 103.

Although the second antenna module 104 is configured to receive the radio signal of the second wireless communications standard, the second antenna module 104 can also receive the radio signal of the first wireless communications standard. However, because an operating frequency band of the second antenna module 104 is located in a frequency range of the second wireless communications standard, a gain is relatively low when the second antenna module 104 receives the radio signal of the first wireless communications standard. The second transceiver module 105 is configured to implement the transceiver function for the radio frequency signal of the second wireless communications standard. When the second transceiver module 105 receives a radio signal of the first wireless communications standard sent by the second antenna module 104, as long as an operating frequency band of the second transceiver module 105 is enabled to locate in a frequency range of the first wireless communications standard, the second transceiver module 105 may also implement the transceiver function for the radio frequency signal of the first wireless communications standard. Therefore, when the second transceiver module 105 connects to the first baseband module 103, the first baseband module may receive the radio frequency signal of the first wireless communications standard from the second transceiver module 105. As a result, the second antenna module 104, the second transceiver module 105, and the first baseband module 103 form a new path of the first wireless communications standard, and the first baseband module 103 combines a signal on the foregoing new path of the first wireless communications standard with that on the original path of the first wireless communications standard that includes the first antenna module 101, the first transceiver module 102, and the first baseband module 103, which improves a receive capability of the first wireless communications standard and is referred to as diversity receive.

After the diversity receive path 108 is disposed between the second transceiver module 105 and the first baseband module 103, the first baseband module 103 can receive a signal through the second antenna module 104 and the second transceiver module 105. The multi-mode wireless terminal in this embodiment supports two wireless communications standards at the same time. Although the diversity receive path 108 is disposed between the second transceiver module 105 and the first baseband module 103, because the second transceiver module 105 further needs to perform data transmission with the second baseband module 106, the first baseband module 103 cannot receive data transmitted by the second transceiver module 105 anytime. Therefore, the second transceiver module 105 further includes the control unit 107, where the control unit 107 is configured to control the second antenna module 104 and the second transceiver module 105 to serve, at the idle timeslot of the second wireless communications standard, as the diversity receive path of the first baseband module 103.

The second wireless communications standard has two states: data sending and data receiving. Upon the data sending of the second wireless communications standard, data is sent from the second baseband module 106 to the second transceiver module 105 and is sent out from the second antenna module 104. In this case, a timeslot of the second wireless communications standard is occupied for sending the data, and the second transceiver module 105 fails to transmit data to the first baseband module 103. Upon the data receiving of the second wireless communications standard, data is sent from the second antenna module 104 to the second transceiver module 105 and is sent to the second baseband module 106 by the second transceiver module 105. In this case, the timeslot of the second wireless communications standard is occupied for receiving the data. However, because the first wireless communications standard is different from the second wireless communications standard, their parameters such as frequencies and modulation manners are also different. Therefore, the second transceiver module 105 can also receive data of the first wireless communications standard and send the data of the first wireless communications standard to the first baseband module 103 through the diversity receive path 108. In addition, generally, data is not sent or received anytime in the second wireless communications standard. In a standby state, signaling is monitored only at some timeslots, and at the other timeslots, the second wireless communications standard is in a sleep mode. When the second wireless communications standard is at a timeslot of the sleep mode, the data of the first wireless communications standard can also be received through the second antenna module 104 and the second transceiver module 105 and be sent to the first baseband module 103 through the diversity receive path 108.

Therefore, the control unit 107 in the second transceiver module 105 can receive the data of the first wireless communications standard at the idle timeslot of the second wireless communications standard by controlling an antenna switch in the second transceiver module 105, and send the received data of the first wireless communications standard to the first baseband module 103 through the diversity receive path 108. In this way, the first baseband module 103 can receive the data sent by the second transceiver module 105 at all timeslots except the timeslot, for sending data, of the second wireless communications standard, so that the path of the second wireless communications standard can serve as the diversity receive path of the first wireless communications standard at most time and does not affect the second wireless communications standard, which improves receive performance of the first wireless communications standard. Generally, current wireless communications transceiver modules comprise a programmable chip, and therefore, the control unit 107 in the second transceiver module 105 may be implemented in a software manner. In this way, assuming that the user performs the data service by using the first wireless communications standard of the multi-mode wireless terminal provided in this embodiment, because the path of the second wireless communications standard may serve as the diversity receive path of the first wireless communications standard at most time, the call service of the first wireless communications standard may be monitored by the second wireless communications standard, and the first wireless communications standard can perform the data service by using all path resources, which improves the receive performance of the multi-mode wireless terminal.

In addition, optionally, the multi-mode wireless terminal provided in this embodiment may further include a central processing unit 109, where the central processing unit 109 connects to the first baseband module 103 and the second baseband module 106, and the central processing unit 109 is configured to perform application layer processing on data of the first wireless communications standard and that of the second wireless communications standard. Because the central processing unit 109 generally uses a chip with a relatively strong processing capability, the central processing unit 109 may be shared by the first wireless communications standard and the second wireless communications standard. However, this embodiment is not limited thereto, and a stand-alone central processing unit may be disposed for the first wireless communications standard and the second wireless communications standard.

It should be noted that, this embodiment only describes that the second antenna module and the second transceiver module in the path of the second wireless communications standard serve as the diversity receive path of the first wireless communications standard. However, a person skilled in the art may understand that, the first antenna module and the first transceiver module in the path of the first wireless communications standard may also serve as a diversity receive path of the second wireless communications standard. Alternatively, the path of the second wireless communications standard and the path of the first wireless communications standard may serve as the diversity receive path of each other according to a same structure of this embodiment. Moreover, when the multi-mode wireless terminal simultaneously supports three or more wireless communications standards, and has three or more paths of the wireless communications standards, two or more of the paths of the wireless communications standards may simultaneously serve as a diversity receive path of one wireless communications standard.

In this embodiment, an antenna module and a transceiver module of a wireless communications standard in a multi-mode wireless terminal serve as a diversity receive path of another wireless communications standard, and a control unit is set in the transceiver module for diversity receive, where the control unit is configured to control the antenna module and the transceiver module to serve, at an idle timeslot, as the diversity receive path of the another wireless communications standard, so that the wireless communications standard of the multi-mode wireless terminal can receive a signal by using an idle timeslot of the another wireless communications standard, which improves receive performance of the multi-mode wireless terminal.

In addition, compared with an existing multi-mode wireless terminal, the multi-mode wireless terminal provided in this embodiment has only the diversity receive path 108 that connects the second transceiver module 105 to the first baseband module 103 added, where the diversity receive path 108 includes only a signal line for receiving data and a related matching network and does not include any component that has a control function. Therefore, a size of the multi-mode wireless terminal basically does not increase.

Figure 2:
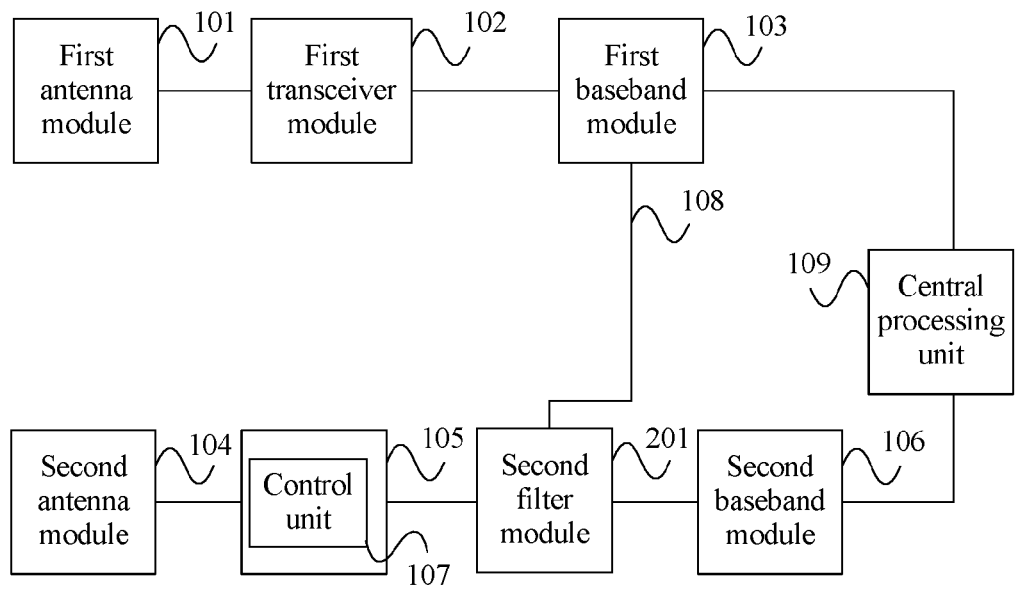
FIG. 2 is a schematic structural diagram of Embodiment 2 of a multi-mode wireless terminal according to an embodiment of the present disclosure.

FIG. 2 is a schematic structural diagram of Embodiment 2 of a multi-mode wireless terminal according to an embodiment of the present disclosure. As shown in FIG. 2, a difference between the multi-mode wireless terminal in this embodiment and the multi-mode wireless terminal shown in FIG. 1 lies in that:

A path of a second wireless communications standard further includes a second filter module 201, where a passband of the second filter module 201 is located in a receive frequency band of a first wireless communications standard and a receive frequency band of the second wireless communications standard. A second baseband module 106 connects to a second transceiver module 105 through the second filter module 201, and a first baseband module 103 connects to the second transceiver module 105 through the second filter module 201.

Specifically, the first wireless communications standard is different from the second wireless communications standard, and frequencies of two different wireless communications standards are generally different. Therefore, in the wireless terminal, to perform processing on a signal of a required wireless communications standard, filtering processing needs to be performed on a received radio signal. Each wireless communications standard has one or more fixed operating frequency bands. In a path of a wireless communications standard, a filter module whose passband is the same as the operating frequency band needs to be disposed, so as to filter out a radio signal of another frequency.

In this embodiment, because a second antenna module 104 and the second transceiver module 105 receive both a radio signal of the first wireless communications standard and a radio signal of the second wireless communications standard, the second filter module 201 is disposed in the path of the second wireless communications standard, where the second filter module 201 is configured to separate the signal of the first wireless communications standard from that of the second wireless communications standard. The second filter module 201 may have at least two passbands, where one passband is located in the receive frequency band of the first wireless communications standard, and the other passband is located in the receive frequency band of the second wireless communications standard. A signal, of the second filter module 201, obtained by means of filtering by using the passband located in the receive frequency band of the first wireless communications standard is sent to the first baseband module 103, and a signal, of the second filter module 201, obtained by means of filtering by using the passband located in the receive frequency band of the second wireless communications standard is sent to the second baseband module 106. In this way, both the first baseband module 103 and the second baseband module 106 receive the signal of their own receive frequency bands, which avoids interference from a signal of another frequency.

Figure 3:
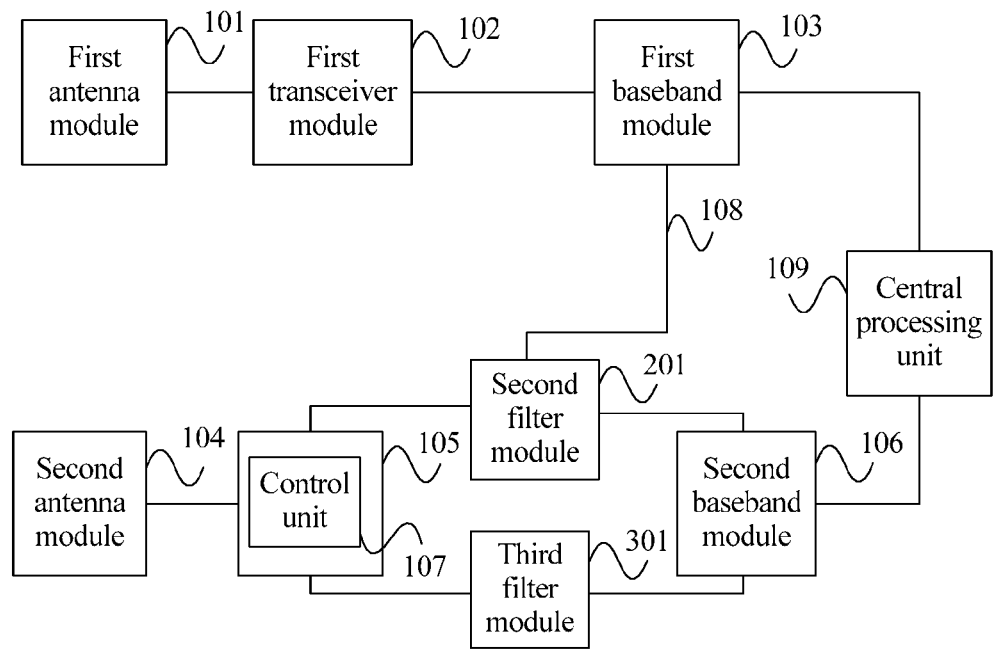
FIG. 3 is a schematic structural diagram of Embodiment 3 of a multi-mode wireless terminal according to an embodiment of the present disclosure.

FIG. 3 is a schematic structural diagram of Embodiment 3 of a multi-mode wireless terminal according to an embodiment of the present disclosure. As shown in FIG. 3, a difference between the multi-mode wireless terminal in this embodiment and the multi-mode wireless terminal shown in FIG. 2 lies in that:

A second wireless communications standard includes a first receive frequency band and a second receive frequency band. A passband of a second filter module 201 is located in a receive frequency band of a first wireless communications standard and the first receive frequency band of the second wireless communications standard. A path of the second wireless communications standard further includes a third filter module 301. A passband of the third filter module 301 is located in the second receive frequency band of the second wireless communications standard, and the third filter module 301 is located between a second baseband module 106 and a second transceiver module 105. A control unit 107 is further configured to, when the multi-mode wireless terminal operates in the first receive frequency band of the second wireless communications standard, control the second transceiver module 105 to connect to the second filter module 201, and when the multi-mode wireless terminal operates in the second receive frequency band of the second wireless communications standard, control the second transceiver module 105 to connect to the third filter module 301.

Specifically, in an existing wireless communications technology, due to limited frequency band resources, one wireless communications standard may have two or more frequency bands with different frequency ranges. However, an antenna module and a transceiver module of the wireless communications standard can only simultaneously operate in one frequency range. With respect to the multi-mode wireless terminal provided in the present disclosure, the multi-mode wireless terminal described in this embodiment is proposed so that one wireless communications standard can use a path of a wireless communications standard that has two or more frequency ranges as a diversity receive path.

As shown in FIG. 3, in this embodiment, the second wireless communications standard includes the first receive frequency band and the second receive frequency band, and the path of the second wireless communications standard have both the second filter module 201 and the third filter module 301, where the passband of the second filter module 201 is located in the first receive frequency band of the second wireless communications standard and the receive frequency band of the first wireless communications standard, and the passband of the third filter module 301 is located in the second receive frequency band of the second wireless communications standard. The first wireless communications standard uses a path that includes a second antenna module 104, the second transceiver module 105, and the second filter module 201 as a diversity receive path.

The second wireless communications standard includes the first receive frequency band and the second receive frequency band. Accordingly, the second wireless communications standard further has a first transmit frequency band and a second transmit frequency band, and the second wireless communications standard can operate in only one frequency band at one time. With reference to a data sending state and a data receiving state, work states of the second wireless communications standard may fall into four types: data receiving in the first receive frequency band, data sending in the first transmit frequency band, data receiving in the second receive frequency band, and data sending in the second transmit frequency band. It can be learned from the embodiment shown in FIG. 1 that, when data is sent in the second wireless communications standard, a timeslot of the second wireless communications standard is occupied for sending data. In this case, data cannot be received in any frequency band, that is, in the foregoing four states, upon the data sending in the first transmit frequency band and the data sending in the second transmit frequency band, the first wireless communications standard cannot use the path of the second wireless communications standard as the diversity receive path. Upon the data receiving in the second receive frequency band, the second transceiver module 105 needs to select a path that includes the second antenna module 104, the second transceiver module 105, the third filter module 301, and the second baseband module 106. Therefore, in this case, the first baseband module 103 still cannot receive the data sent from the second transceiver module 105, that is, in this work state, the first wireless communications standard still cannot use the path of the second wireless communications standard as the diversity receive path. Therefore, only in the state of data receiving in the first receive frequency band, the first wireless communications standard can receive data of the first wireless communications standard through a diversity receive path that includes the second antenna module 104, the second transceiver module 105, the second filter module 201, and a diversity receive circuit 107. The control unit 107 may be used to control selection of different receiving manners at each timeslot.

Further, the control unit 107 is further configured to, when the multi-mode wireless terminal operates in the second receive frequency band of the second wireless communications standard, control the second transceiver module 105 to connect to the second filter module 201 at idle timeslots of the first receive frequency band and the second receive frequency band of the second wireless communications standard. Generally, data is not sent or received anytime in the second wireless communications standard. In a standby state, signaling is monitored only at some timeslots, and at the other timeslots, the second wireless communications standard is in a sleep mode. When the second wireless communications standard is at a timeslot of the sleep mode, the data of the first wireless communications standard can also be received through the second antenna module 104 and the second transceiver module 105 and be sent to the first baseband module 103 through the second filter module 201 and the diversity receive path 108. This requires the control unit 107 to connect the second transceiver module 105 to the second filter module 201 at the idle timeslots of the first receive frequency band and the second receive frequency band of the second wireless communications standard.

Figure 4:
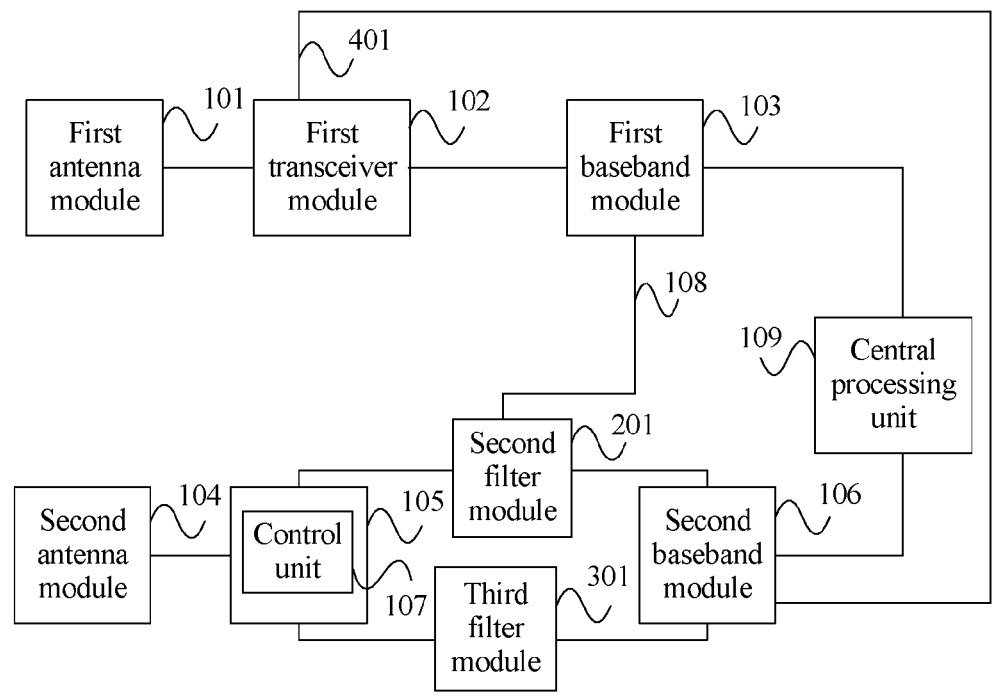
FIG. 4 is a schematic structural diagram of Embodiment 4 of a multi-mode wireless terminal according to an embodiment of the present disclosure.

FIG. 4 is a schematic structural diagram of Embodiment 4 of a multi-mode wireless terminal according to an embodiment of the present disclosure. As shown in FIG. 4, a difference between the multi-mode wireless terminal in this embodiment and the multi-mode wireless terminal shown in FIG. 3 lies in that:

A first transceiver module 102 connects to a second baseband module 106 through a second diversity receive circuit 401. The first transceiver module 102 includes a second control unit 402, where the second control unit 402 is configured to control a first antenna module 101 and the first transceiver module 102 to serve, at an idle timeslot of the first wireless communications standard, as a diversity receive path of the second wireless communications standard.

Specifically, this embodiment describes a case in which a path of the first wireless communications standard serves as a diversity receive path of a second wireless communications standard and a path of the second wireless communications standard serves as a diversity receive path of the first wireless communications standard at the same time. A specific implementation method in which the path of the first wireless communications standard serves as the diversity receive path of the second wireless communications standard is similar to descriptions of the foregoing embodiments.

Figure 5:
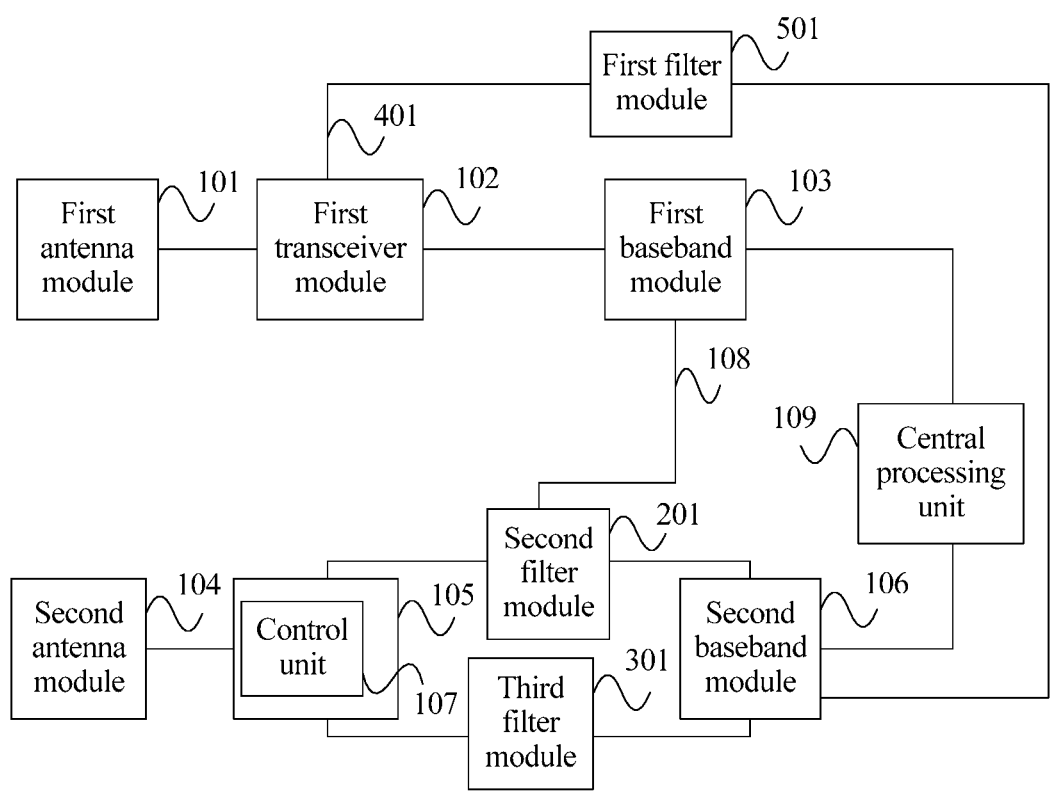
FIG. 5 is a schematic structural diagram of Embodiment 5 of a multi-mode wireless terminal according to an embodiment of the present disclosure.

FIG. 5 is a schematic structural diagram of Embodiment 5 of a multi-mode wireless terminal according to an embodiment of the present disclosure. As shown in FIG. 5, a difference between the multi-mode wireless terminal in this embodiment and the multi-mode wireless terminal shown in FIG. 4 lies in that:

A path of a first wireless communications standard further includes a first filter module 501. A passband of the first filter module 501 is located in a receive frequency band of a second wireless communications standard and a receive frequency band of the first wireless communications standard. A first baseband module 103 connects to a first transceiver module 102 through the first filter module 501, and a second baseband module 106 connects to the first transceiver module 102 through the first filter module 501.

Specifically, similar to the embodiment shown in FIG. 2, the first wireless communications standard is different from the second wireless communications standard, and frequencies of two different wireless communications standards are generally different. Therefore, the first filter module 501 is disposed in the path of the first wireless communications standard, and the first filter module 501 is configured to separate a signal of the first wireless communications standard from that of the second wireless communications standard. The first filter module 501 may have at least two passbands, where one passband is located in the receive frequency band of the first wireless communications standard, and the other passband is located in the receive frequency band of the second wireless communications standard. It should be noted herein that, because the second wireless communications standard has two receive frequency bands in this embodiment, the passband of the first filter module 501 needs to be set according to a frequency band of the diversity receive path that needs to be used by the second wireless communications standard. A signal, of the first filter module 501, obtained by means of filtering by using the passband located in the receive frequency band of the second wireless communications standard is sent to the second baseband module 106, and a signal, of the first filter module 501, obtained by means of filtering by using the passband located in the receive frequency band of the first wireless communications standard is sent to the first baseband module 103. In this way, both the first baseband module 103 and the second baseband module 106 receive the signal of their own receive frequency bands, which avoids interference from a signal of another frequency.

It should be noted that, in the foregoing embodiments, only some modules in a receive path of the multi-mode wireless terminal are considered. However, a person skilled in the art may understand that, the multi-mode wireless terminal provided in the embodiments of the present disclosure further includes a transmit path. In addition, the receive path further includes a module or a component that implements functions such as amplification and filtering. Moreover, the multi-mode wireless terminal further includes various matching circuits and a component that implements another function, and the receive path and the transmit path may use single-ended signal or differential signal.

Figure 6:
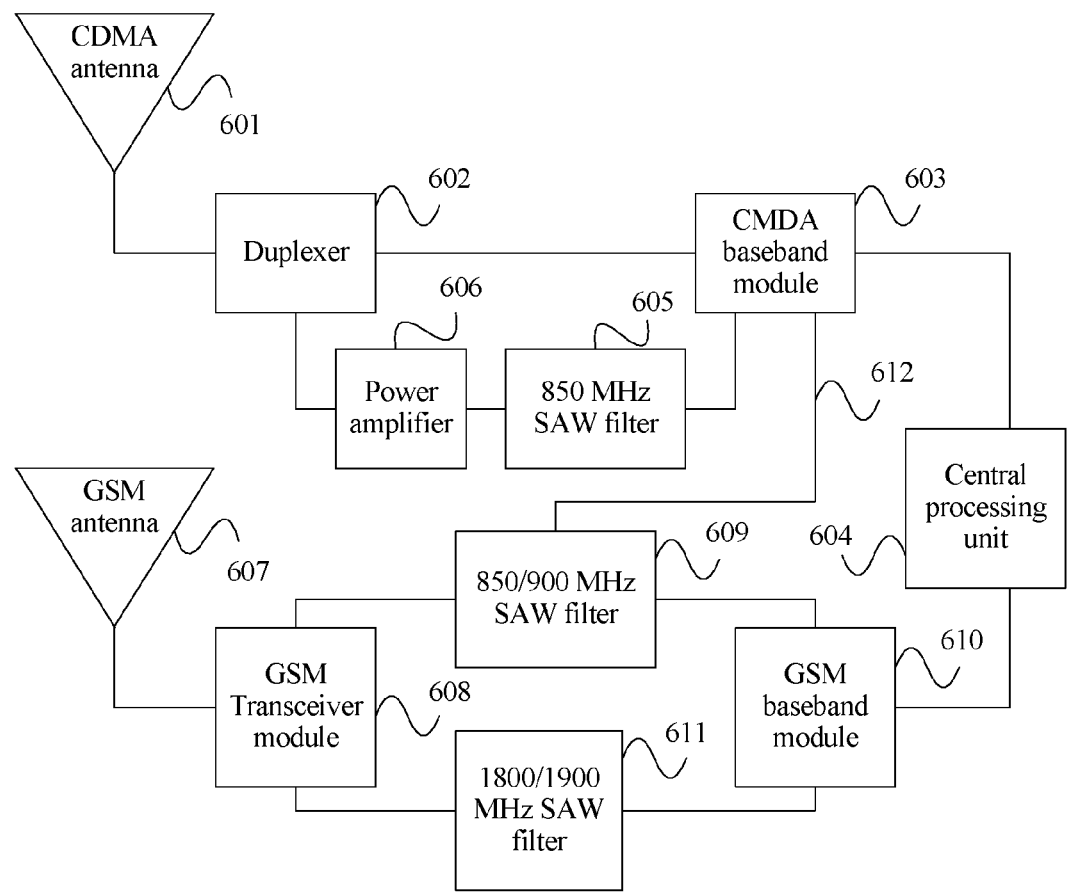
FIG. 6 is a schematic structural diagram of Embodiment 6 of a multi-mode wireless terminal according to an embodiment of the present disclosure.

The following uses a specific embodiment to describe a multi-mode wireless terminal according to an embodiment of the present disclosure. FIG. 6 is a schematic structural diagram of Embodiment 6 of a multi-mode wireless terminal according to an embodiment of the present disclosure. As shown in FIG. 6, this embodiment provides a schematic structural diagram of a dual card dual standby dual pass mobile phone of CDMA and GSM, where the GSM has two frequency ranges: 900 MHz and 1800/1900 MHz, and the CDMA of 800 MHz uses the GSM 900 MHz frequency range as a diversity receive path.

A CDMA antenna 601, a duplexer 602, a CDMA baseband module 603, and a central processing unit 604 form a CDMA receive path, where the CDMA baseband module 603 uses a WTR1605 chip, the central processing unit 604 uses an MSM8930 chip, and the CDMA baseband module 603 uses differential signaling for receiving. The central processing unit 604, the CDMA baseband module 603, an 850 MHz SAW filter 605, a power amplifier (PA) 606, the duplexer 602, and the CDMA antenna 601 form a CDMA transmit path. The duplexer 602, the 850 MHz SAW filter 605, and the power amplifier 606 may collectively be referred to as a CDMA transceiver module. A GSM antenna 607, a GSM transceiver module 608, an 850/900 MHz SAW filter 609, a GSM baseband module 610, and the central processing unit 604 form a GSM 900 MHz receive path. The GSM antenna 607, the GSM transceiver module 608, a 1800/1900 MHz SAW filter 611, the GSM baseband module 610, and the central processing unit 604 form a GSM 1800/1900 MHz receive path. The central processing unit 604, the GSM baseband module 610, the GSM transceiver module 608, and the GSM antenna 607 form a GSM transmit path. The GSM transceiver module 608 uses a TQM6M4068 chip, and the GSM baseband module 610 uses an MTK6252D chip. The 850/900 MHz SAW filter 609 connects to the CDMA baseband module 603 through a diversity receive circuit 612. The GSM baseband module 610 uses differential signaling for receiving. The GSM transceiver module 608 has five work states, which are: GSM 900 MHz sending, GSM 1800/1900 MHz sending, GSM 900 MHz receiving, GSM 1800/1900 MHz receiving, and a sleep mode. Three control levels are set in the GSM transceiver module 608, so as to control the five work states, and further select the GSM antenna 607 to connect to a corresponding filter or baseband module. For example, three control levels, that is, TXEN, VBS1, and VBS2 are set in the GSM transceiver module 608, and the five work states may be controlled as shown in Table 1.

TABLE 1

Switch logic truth table

| Work state | TXEN | VBS1 | VBS2 |
|---|---|---|---|
| GSM 900 MHz sending | 1 | 0 | 0 |
| GSM 1800/1900 MHz sending | 1 | 1 | 0 |
| GSM 900 MHz receiving | 0 | 0 | 1 |
| GSM 1800/1900 MHz receiving | 0 | 1 | 1 |
| Sleep mode | 0 | 0 | 0 |

When a work state of the GSM transceiver module 608 is the GSM 900 MHz receiving and the sleep mode, the GSM transceiver module 608 connects to the CDMA baseband module 603 through the diversity receive circuit 612, thereby implementing CDMA diversity receive. In a GSM call state, because the GSM is in a time division duplex (TDD) mode, GSM transmit occupies only one timeslot in eight timeslots of each frame, and when the GSM 1800/1900 MHz receiving is used, similarly, only one timeslot is occupied. In the other six timeslots for the sleep mode and the GSM 900 MHz receiving, the CDMA can implement the diversity receive, thereby greatly improving receive performance of a CDMA path.

The foregoing embodiment of the present disclosure only uses two wireless communications standards, that is, GSM and CDMA as an example for description, and the multi-mode wireless terminal provided in the present disclosure is not limited thereto. Any multi-mode wireless terminal that supports at least two wireless communications standards shall fall within the protection scope of the present disclosure, for example, simultaneous voice and Long Term Evolution (LTE) (Simultaneous Voice and LTE: "SVLTE"), and simultaneous GSM and LTE (Simultaneous GSM and LTE: "SGLTE").

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A multi-mode wireless terminal, comprising:
   a first antenna, a first transceiver, and a first baseband module; and
   a second antenna, a second transceiver, and a second baseband module, wherein:
   a path of a first wireless communications standard comprises the first antenna, the first transceiver, and the first baseband module, wherein the first antenna connects to the first transceiver, and the first transceiver connects to the first baseband module;
   a path of a second wireless communications standard comprises the second antenna, the second transceiver, and the second baseband module, wherein the second antenna connects to the second transceiver, and the second transceiver connects to the second baseband module;
   the first wireless communications standard is different from the second wireless communications standard;
   the second transceiver connects to the first baseband module;
   the second transceiver comprises a control unit, wherein the control unit is configured to control the second antenna and the second transceiver to serve, at an idle timeslot of the second wireless communications standard, as a diversity receive path of the first wireless communications standard;
   the path of the second wireless communications standard further comprises a first filter module;
   a passband of the first filter module is located in a receive frequency band of the first wireless communications standard and the passband of the first filter module is located in a receive frequency band of the second wireless communications standard; and
   the second baseband module connects to the second transceiver through the first filter module, and the first baseband module connects to the second transceiver through the first filter module.

2. The multi-mode wireless terminal according to claim 1, wherein:
   the second wireless communications standard comprises a first receive frequency band and a second receive frequency band, and the passband of the first filter module is located in the receive frequency band of the first wireless communications standard and the passband of the first filter module is located in the first receive frequency band of the second wireless communications standard;
   the path of the second wireless communications standard further comprises a second filter module;
   a passband of the second filter module is located in the second receive frequency band of the second wireless communications standard, and the second filter module is located between the second baseband module and the second transceiver module; and
   the control unit is further configured to, when the multi-mode wireless terminal operates in the first receive frequency band of the second wireless communications standard, control the second transceiver to connect to the first filter module; and when the multi-mode wireless terminal operates in the second receive frequency band of the second wireless communications standard, control the second transceiver to connect to the second filter module.

3. The multi-mode wireless terminal according to claim 2, wherein the control unit is further configured to, when the multi-mode wireless terminal operates in the second receive frequency band of the second wireless communications standard, control the second transceiver to connect to the first filter module at idle timeslots of the first receive frequency band of the second wireless communications standard and idle timeslots of the second receive frequency band of the second wireless communications standard.

4. The multi-mode wireless terminal according to claim 1, wherein:
the first transceiver connects to the second baseband module; and
the first transceiver module comprises a second control unit, wherein the second control unit is configured to control the first antenna and the first transceiver to serve, at an idle timeslot of the first wireless communications standard, as a diversity receive path of the second wireless communications standard.

5. A multi-mode wireless terminal, comprising:
a first antenna, a first transceiver, and a first baseband module; and
a second antenna, a second transceiver, and a second baseband module,
wherein:
a path of a first wireless communications standard comprises the first antenna, the first transceiver, and the first baseband module, wherein the first antenna connects to the first transceiver, and the first transceiver connects to the first baseband module;
a path of a second wireless communications standard comprises the second antenna, the second transceiver, and the second baseband module, wherein the second antenna connects to the second transceiver, and the second transceiver connects to the second baseband module;
the first wireless communications standard is different from the second wireless communications standard;
the second transceiver connects to the first baseband module;
the second transceiver comprises a control unit, wherein the control unit is configured to control the second antenna and the second transceiver to serve, at an idle timeslot of the second wireless communications standard, as a diversity receive path of the first wireless communications standard;
the first transceiver connects to the second baseband module;
the first transceiver module comprises a second control unit, wherein the second control unit is configured to control the first antenna and the first transceiver to serve, at an idle timeslot of the first wireless communications standard, as a diversity receive path of the second wireless communications standard;
the path of the first wireless communications standard further comprises a third filter module;
a passband of the third filter module is located in the receive frequency band of the second wireless communications standard and the receive frequency band of the first wireless communications standard; and
the first baseband module connects to the first transceiver through the third filter module, and the second baseband module connects to the first transceiver through the third filter module.

6. The multi-mode wireless terminal according to claim 5, wherein the first wireless communications standard is Code Division Multiple Access (CDMA), and the second wireless communications standard is Global System for Mobile Communication (GSM).

\* \* \* \* \*